United States Patent
Bishop et al.

(10) Patent No.: US 10,739,070 B2
(45) Date of Patent: Aug. 11, 2020

(54) SPACE WASTE FLUID EXTRACTION

(71) Applicant: HAMILTON SUNDSTRAND CORPORATION, Charlotte, NC (US)

(72) Inventors: Benjamin Elmer Bishop, South Glastonbury, CT (US); Thomas J Stapleton, Southwick, MA (US); Miguel Angel Torres, S. Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 288 days.

(21) Appl. No.: 15/923,966

(22) Filed: Mar. 16, 2018

(65) Prior Publication Data

US 2019/0285343 A1 Sep. 19, 2019

(51) Int. Cl.
| | | |
|---|---|---|
| F26B 3/34 | (2006.01) | |
| F26B 5/12 | (2006.01) | |
| F26B 3/18 | (2006.01) | |
| B64G 1/22 | (2006.01) | |
| F26B 9/06 | (2006.01) | |
| F26B 7/00 | (2006.01) | |

(52) U.S. Cl.
CPC ............ *F26B 5/12* (2013.01); *B64G 1/22* (2013.01); *F26B 3/18* (2013.01); *F26B 7/00* (2013.01); *F26B 9/06* (2013.01)

(58) Field of Classification Search
CPC ..... B64G 1/22; B64G 1/60; F26B 5/12; F26B 5/04; F26B 3/18; F26B 3/20; F26B 3/347; F26B 9/06; F26B 7/00
USPC .......................................................... 34/263
See application file for complete search history.

(56) References Cited

U.S. PATENT DOCUMENTS

| | | | |
|---|---|---|---|
| 9,003,967 B2 | 4/2015 | Reed et al. | |
| 2007/0022626 A1* | 2/2007 | Gomi | F26B 5/04 |
| | | | 34/329 |
| 2010/0160709 A1 | 6/2010 | Grierson et al. | |
| 2015/0316320 A1* | 11/2015 | Maguire | B29B 13/065 |
| | | | 34/412 |

FOREIGN PATENT DOCUMENTS

WO   2008025134   3/2008

* cited by examiner

*Primary Examiner* — John P McCormack
(74) *Attorney, Agent, or Firm* — Snell & Wilmer L.L.P.

(57) ABSTRACT

A fluid extraction apparatus includes a first chamber within which waste material is configured to be disposed and a second chamber having a vacuum source interface. The first chamber may be in selective fluid communication with the second chamber. In various embodiments, the fluid extraction apparatus further includes an intermediate valve disposed on a conduit extending between the first chamber and the second chamber, wherein the intermediate valve is selectively actuatable to control the selective fluid communication. In various embodiments, the selective fluid communication between the first chamber and the second chamber is exclusively via the intermediate valve and the conduit.

18 Claims, 6 Drawing Sheets

SPACE WASTE FLUID EXTRACTION

FIELD

The present disclosure relates to fluid extraction systems, and more specifically, to extracting water from space waste material.

BACKGROUND

Conventional Waste Collector Systems (WCS) aboard, for example, the Space Shuttle and International Space Station (ISS), utilize air flow to entrain human waste. For example, fecal material is typically collected by air flow entrainment. For instance, air may enter in a fairly uniform radial direction under a seat of the WCS. Air drag then helps separate the fecal bolus and draw it into a tank or fecal collection bag. The collected feces are generally thrown overboard. Because a substantial portion of fecal matter is comprised of water, disposing of collected fecal matter in this manner results in a loss of water, a valuable resource for space travel, from the spacecraft.

SUMMARY

In various embodiments, the present disclosure provides a fluid extraction apparatus that includes a first chamber within which waste material is configured to be disposed and a second chamber comprising a vacuum source interface. The first chamber may be in selective fluid communication with the second chamber. In various embodiments, the fluid extraction apparatus further includes an intermediate valve disposed on a conduit extending between the first chamber and the second chamber, wherein the intermediate valve is selectively actuatable to control the selective fluid communication. In various embodiments, the selective fluid communication between the first chamber and the second chamber is exclusively via the intermediate valve and the conduit.

In various embodiments, the first chamber includes an air inlet. In various embodiments, the first chamber includes a sealable door that is configured to open to allow the waste material to be placed within the first chamber. The second chamber may include a fluid outlet through which extracted fluid from the waste material is configured to flow. In various embodiments, the fluid extraction apparatus further includes a heater coupled to the first chamber. The second chamber may include heat transfer augmentation features. In various embodiments, the second chamber is rotatable to facilitate collection of extracted fluid.

Also disclosed herein, according to various embodiments, is a waste processing system that includes a fluid extraction apparatus. The fluid extraction apparatus may comprise a first chamber within which waste material is configured to be disposed and a second chamber comprising a vacuum source interface. The first chamber may be in selective fluid communication with the second chamber. The waste processing system also includes an intermediate valve disposed fluidly between the first chamber and the second chamber, according to various embodiments. The intermediate valve may be selectively actuatable to control the selective fluid communication. The waste processing system may further include a controller having a processor and a tangible, non-transitory memory. The tangible, non-transitory memory may be configured to communicate with the processor, and the tangible, non-transitory memory may have instructions stored thereon that, in response to execution by the processor, cause the waste processing system to perform various operations. The various operations include decreasing, by the processor and with the intermediate valve in a closed position, a second pressure in the second chamber, according to various embodiments. The various operations also include after decreasing the second pressure in the second chamber, actuating the intermediate valve, by the processor, to an open position to cause rapid decompression of the first chamber, thereby lowering a first pressure in the first chamber, according to various embodiments.

In various embodiments, the waste processing system further includes a vacuum source coupled to the second chamber at the vacuum source interface. Accordingly, the step of decreasing the second pressure in the second chamber may include at least one of actuating the vacuum source and actuating a vacuum valve disposed between the vacuum source and the second chamber. In various embodiments, the first chamber includes an air inlet and an air valve. The operations may further include actuating the air valve to introduce air into the first chamber to facilitate transport of extracted fluid from the waste material in the first chamber to the second chamber. In various embodiments, the operations further include repeating the decreasing and the actuating steps (e.g., until a extent of extraction).

Also disclosed herein, according to various embodiments, is a method for extracting fluid from waste material. The method may include decreasing a second pressure in a second chamber with an intermediate valve in a closed position. The intermediate valve may be disposed between the second chamber and a first chamber. After decreasing the second pressure in the second chamber, the method may include actuating the intermediate valve to an open position to cause rapid decompression of the first chamber, thereby lowering a first pressure in the first chamber and thereby extracting the fluid contained with the waste material disposed within the first chamber.

In various embodiments, the step of actuating the intermediate valve to the open position chamber causes the fluid to exit the first chamber and flow into the second chamber. In various embodiments, the method further includes actuating a heater coupled to the first chamber to control a temperature of the waste material. In various embodiments, the step of decreasing the second pressure in the second chamber includes at least one of actuating a vacuum source and actuating a vacuum valve disposed between the vacuum source and the second chamber. In various embodiments, the method further includes actuating an air valve coupled to the first chamber to introduce air into the first chamber to facilitate transport of the fluid from the first chamber to the second chamber. Still further, the method may include repeating the decreasing and the actuating steps.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 1 illustrates a schematic view of a fluid extraction apparatus, in accordance with various embodiments;

FIG. 2 illustrates a schematic view of a waste processing system that includes a fluid extraction apparatus, in accordance with various embodiments;

FIG. 3 illustrates a schematic view of a fluid extraction apparatus during or after a rapid decompression stage, in accordance with various embodiments;

Figure 1:
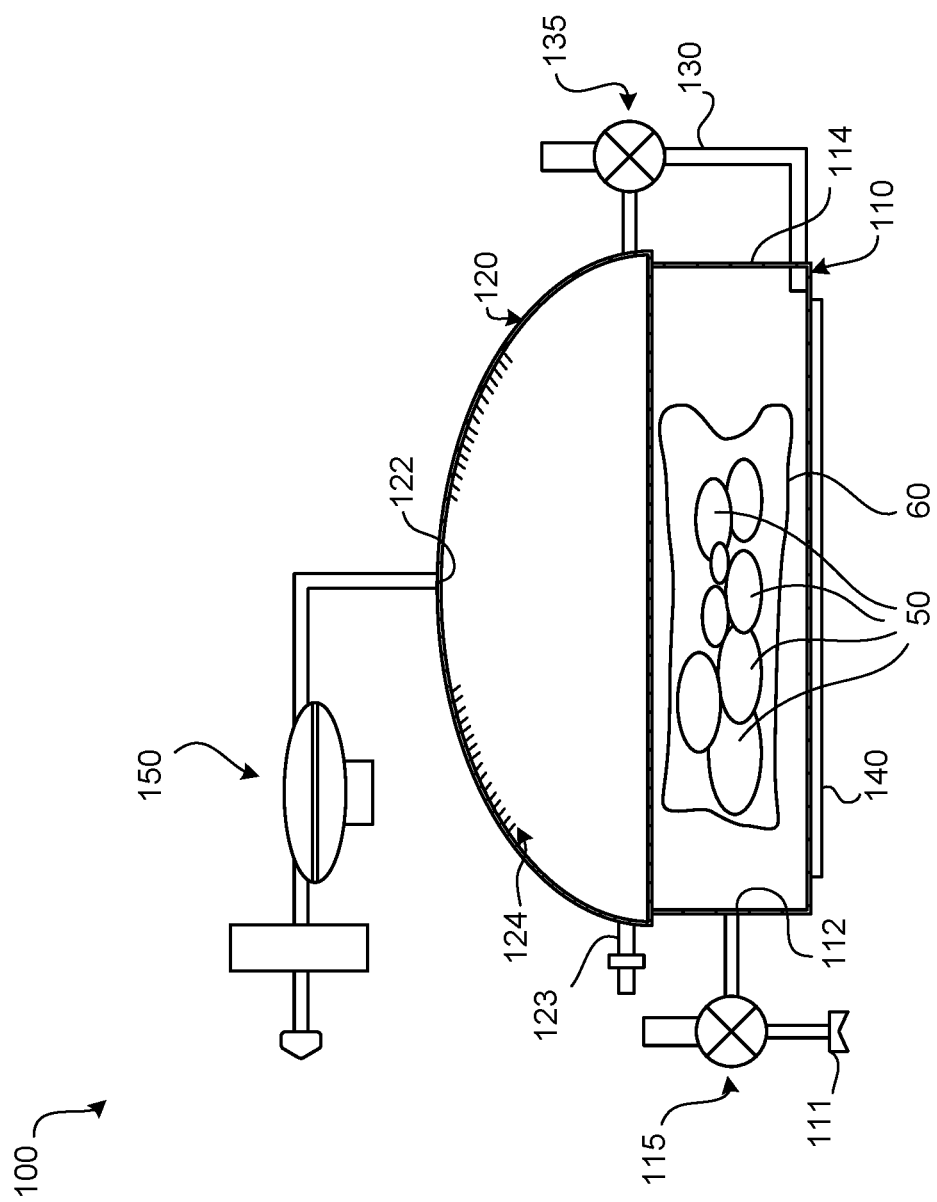

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, and with reference to FIG. 1, a fluid extraction apparatus 100 is provided. The fluid extraction apparatus 100, as described in greater detail below, generally includes two chambers, a first chamber 110 and a second chamber 120, with fluid communication between the two chambers 110, 120 selectively controlled. More specifically, the selectively controlled fluid communication between the first chamber 110 and the second chamber 120 enables rapid and optionally repetitive/successive decompression stages to occur in order to extract fluid, (e.g., water) from waste material. In various embodiments, the fluid extraction apparatus 100 may be used to compact fecal matter, trash, garbage, or other waste. In various embodiments, the fluid extraction apparatus 100 is used to extract and recycle water from fecal matter, food waste, or other waste that may contain water. For example, the fluid extraction apparatus 100 may be utilized to extract waste liquid (e.g., water) from fecal matter for collection/recycling.

The fluid extraction apparatus 100 may be utilized with a system, such as waste processing system 10 described below with reference to FIG. 2. While numerous details are included herein pertaining to using the fluid extraction apparatus as a feces processing apparatus, the scope of the present disclosure is not limited to feces processing. The fluid extraction apparatus 100 (with reference to FIGS. 1, 3, 4, and 5,) and the waste processing system 10 (with reference to FIG. 2) may be implemented for use within the ISS, low earth orbit (LEO) aircraft, crew exploration vehicle (CEV), and/or a space hotel to extract fluid (as described below with reference to the method of FIG. 6) from and otherwise process waste material. Stated another way, the fluid extraction apparatuses, systems, and methods disclosed herein may supplement, replace, and/or be utilized in conjunction with existing aerospace waste collector systems.

The fluid extraction apparatus 100, according to various embodiments and with continued reference to FIG. 1, includes the first chamber 110 and the second chamber 120 mentioned above. The first chamber 110 is configured to hold/retain waste material 50. That is, waste material 50 may be placed into the first chamber 110 for processing. Accordingly, the first chamber 110 may include a sealable door 114 that is configured to open to allow a user to place the waste material 50 into the first chamber 110. The sealable door 114 may be hingedly coupled to the housing that defines the first chamber 110, or the sealable door may have another openable configuration relative to the first chamber 110. In various embodiments, the waste material 50 may first be placed within a porous bag 60 or other such container that retains solid material while allowing fluid to vent. Generally, the porous bag 60 holds the solid waste material while allowing the fluid contained within the waste material 50 to be extracted. The second chamber 120 is configured to be coupled to a vacuum source, such as a vacuum pump 150, via vacuum source interface 122. In various embodiments, instead of or in addition to vacuum pump 150, the vacuum source may be the near-vacuum of space.

In various embodiments, the first chamber 110 and the second chamber 120 are in selective fluid communication with each other. That is, the first chamber 110 and the second chamber 120 may be fluidly isolated from each other except for a selective valve, conduit, tube, or membrane. For example, the fluid extraction apparatus 100 may include an intermediate valve 135 disposed on a conduit 130 extending between the first chamber 110 and the second chamber 120, and the intermediate valve 135 may be actuated to either isolate the two chambers or to fluidly connect the two chambers.

In various embodiments, and as described in greater detail below with reference to the method of FIG. 6, the fluid extraction apparatus 100 is generally configured to rapidly decompress the first chamber 110 and thereby extract the fluid (e.g., water) trapped and/or entrained within the waste material 50. In order to rapidly decompress the first chamber 110, the second chamber 120 is first evacuated to a low (e.g., near-vacuum) pressure. During this evacuation step, the intermediate valve 135 may be closed, thus isolating the two chambers 110, 120 from each other. After evacuating the second chamber 120, the intermediate valve 135 (or other such selective mechanism/feature) may be actuated to open fluid communication between the two chambers 110, 120, thereby causing the pressure in the first chamber 110 to rapidly drop to reach a new equilibrium pressure of the combined volume of the first chamber 110 and the second chamber 120. This rapid decompression of the first chamber 110 is what facilitates and enables efficient extraction of fluid from the waste material 50. That is, the rapid decompression of the first chamber 110 causes expansion (e.g., vaporization) of fluids entrapped or contained within the waste material 50, and the expanded/extracted fluid flows from the first chamber 110 to the second chamber 120 due to the pressure gradient between the second chamber 120 and the first chamber 110. In various embodiments, multiple/successive evacuation and decompression stages may be performed in order to sufficiently extract a desired or adequate amount of fluid. The extracted fluid flowing into the second chamber 120 may be collected for future processing (e.g., a charcoal filter for odor control, etc.).

In various embodiments, the second chamber 120 has a second volume and the first chamber 110 has a first volume, with the second volume being between about 2 and 5 times as large as the first volume. In various embodiments, the second volume is about 3 and 4 times as large as the first volume. As used in this context only, the term about means plus or minus 10% of the indicated value. In various embodiments, the second chamber 120 may have a dome-like shape. In various embodiments, and with reference to FIG. 1, the second chamber may include one or more heat transfer augmentation features 124, such as fins.

Figure 4:
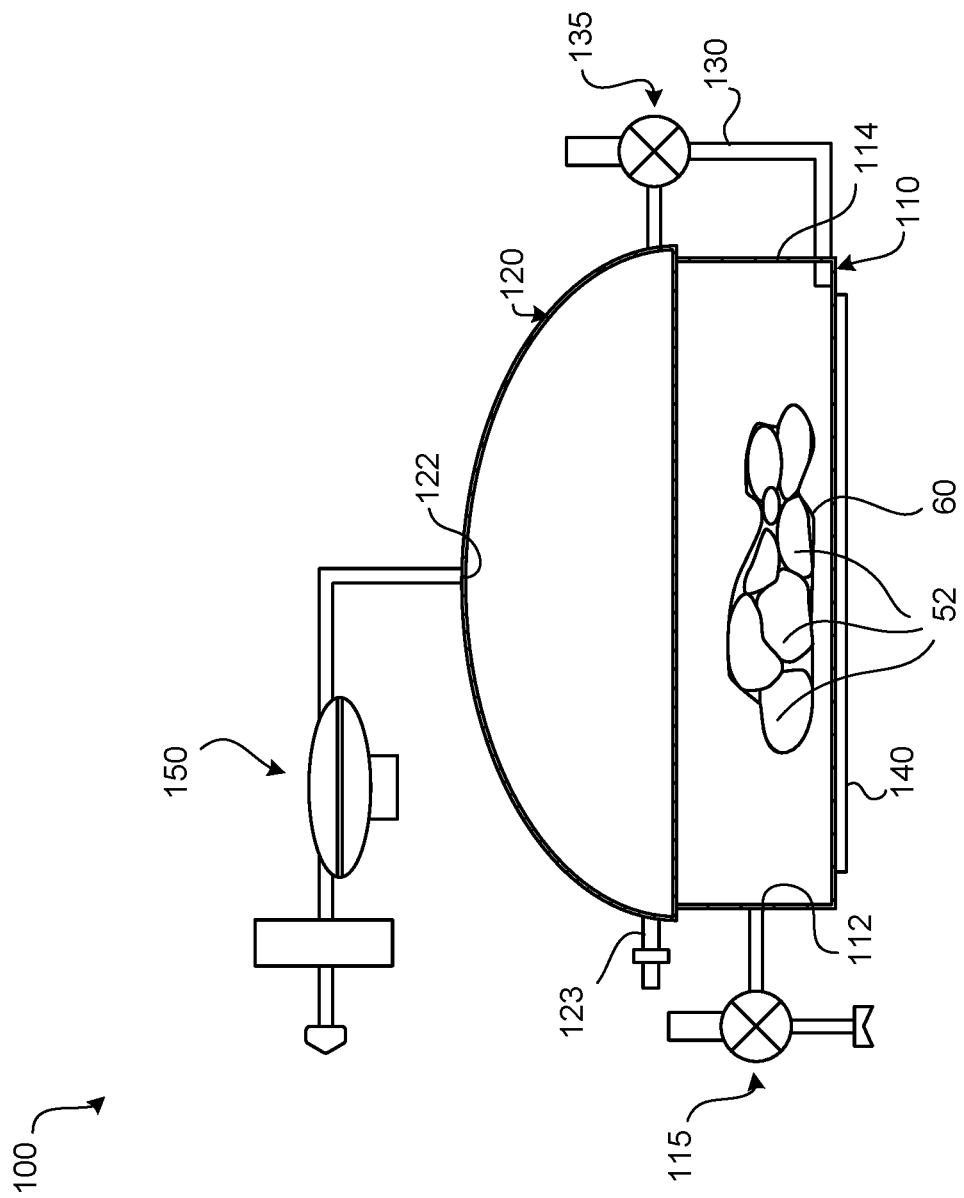
FIG. 4 illustrates a schematic view of a fluid extraction apparatus with waste material in a compacted state, in accordance with various embodiments.
Figure 5:
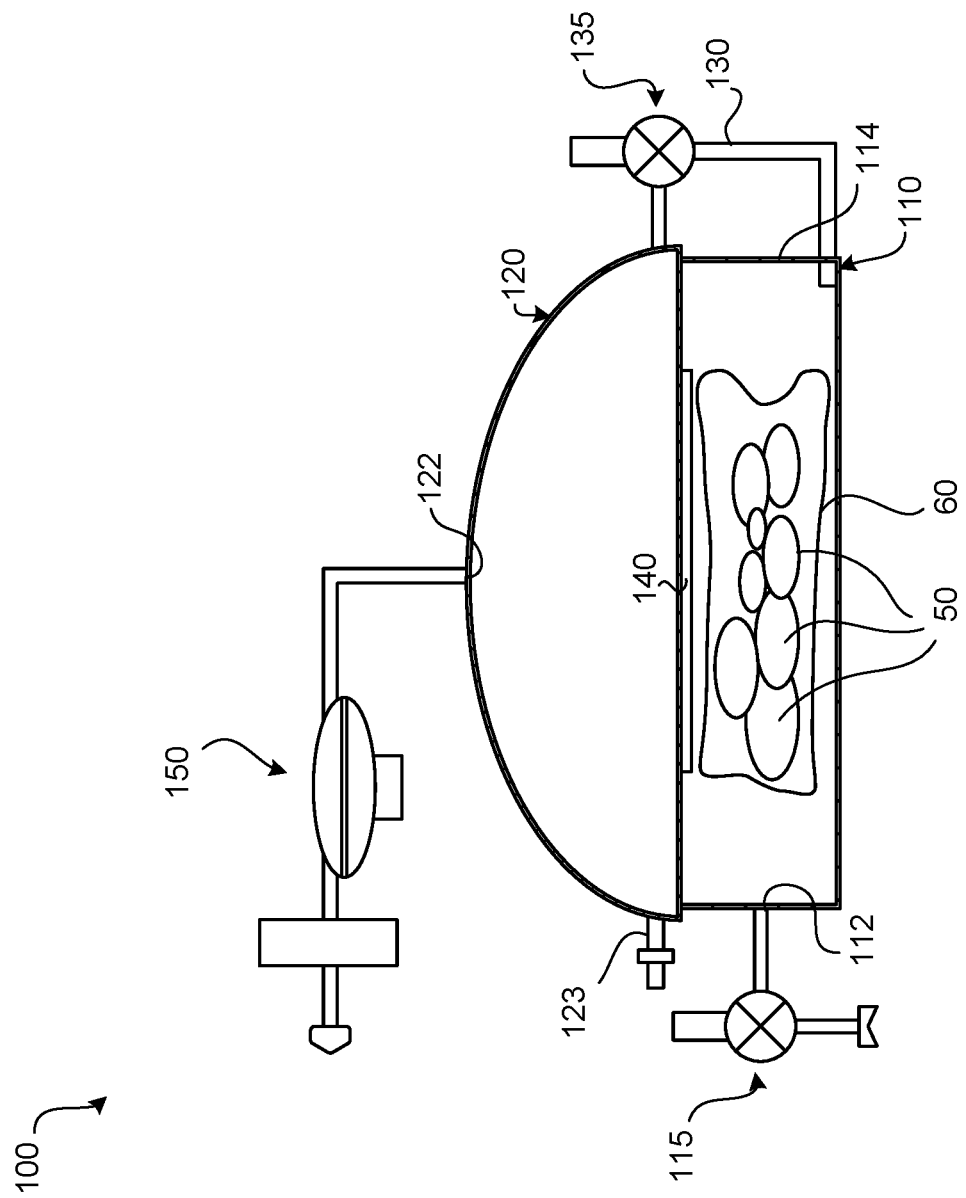
FIG. 5 illustrates a schematic view of a fluid extraction apparatus, in accordance with various embodiments.

After the first chamber 110 has been sufficiently decompressed via the one or more rapid decompression stages and after sufficient fluid has been extracted from the waste material 50, the first chamber 110 may be rapidly re-pressurized (e.g., to atmospheric pressure, or to some other pressure value), thereby causing the waste material to be compacted (as shown in FIG. 4). In various embodiments, the rapid re-pressurization may occur via an air inlet 112, as described below.

In various embodiments, and with continued reference to FIG. 1, the first chamber 110 includes air inlet 112. An air valve 115 may be coupled to the air inlet 112 of the first chamber 110 to selectively control the flow of air into the first chamber 110. At various times during the evacuation and decompression stage(s) or thereafter, the air valve 115 may be actuated to introduce air into the first chamber 110. For example, air may be introduced to the first chamber 110 via the air valve 115 and the air inlet 112 in order to 1) facilitate transport of the fluid extracted from the waste material 50 from the first chamber 110 into the second chamber 120, 2) heat the waste material 50 to prevent freezing, and/or 3) to compact the waste material 50 after extraction, among others. In various embodiments, the air inlet 112 includes a debris filter 111 that is configured to prevent debris and/or other material from entering the apparatus 100. In various embodiments, air from the cabin of an aircraft/spacecraft may flow into the first chamber 110 via the air valve 115 and the air inlet 112 and this cabin air may be used to flush extracted water vapor from the first chamber 110 to the second chamber 120 to be collected.

In various embodiments, the second chamber 120 includes a fluid outlet 123 or a fluid drain through which fluid that has been extracted from the waste material 50 is configured to flow. In various embodiments, the extracted fluid may collect or condense or otherwise accumulate in a region or volume of the second chamber 120. For example, the second chamber 120 may be actively or passively temperature controlled, thereby promoting condensation or otherwise facilitating collection of the extracted fluid. In various embodiments, the second chamber 120 may be rotatable about an axis, similar to a centrifuge device, and the extracted fluid may be directed towards a collection area or the fluid outlet 123 via the apparent centrifugal force. In various embodiments, the extracted fluid, such as water vapor, is configured to be recirculated into the cabin. That is, the fluid outlet 123 may be a vapor vent configured to deliver fluid to the cabin and the extracted fluid may recirculate into the cabin via the fluid outlet 123.

In various embodiments, the fluid extraction apparatus 100 may further include a heater 140 coupled to the first chamber 110 and configured to provide heat to the waste material 50. The heater 140 may be configured to elevate the temperature of the waste material 50, thereby facilitating extraction of fluid from the waste material 50 (e.g., water from fecal matter), to prevent freezing of the waste material 50 (which would hinder fluid extraction), and/or to kill bacteria or other microbes/microorganisms present in the waste material 50. The heater 140 may be a microwave antenna or other microwave transducer. The heater 140 may be mounted below the waste material 50 of the first chamber 110, as shown in FIGS. 1-4, or the heater 140 may be mounted above the waste material 50 of first chamber 110.

Figure 2:
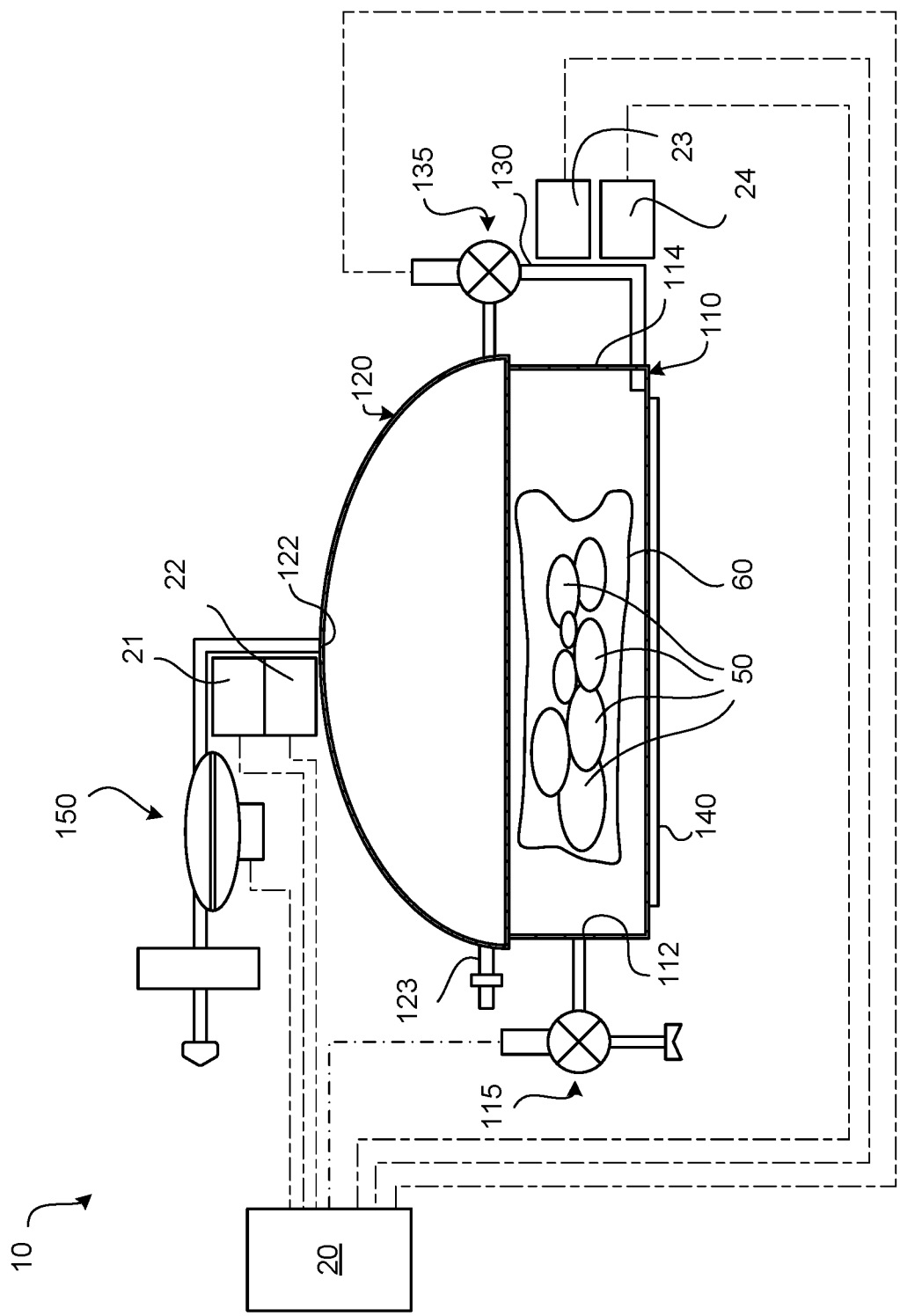
Figure 3:
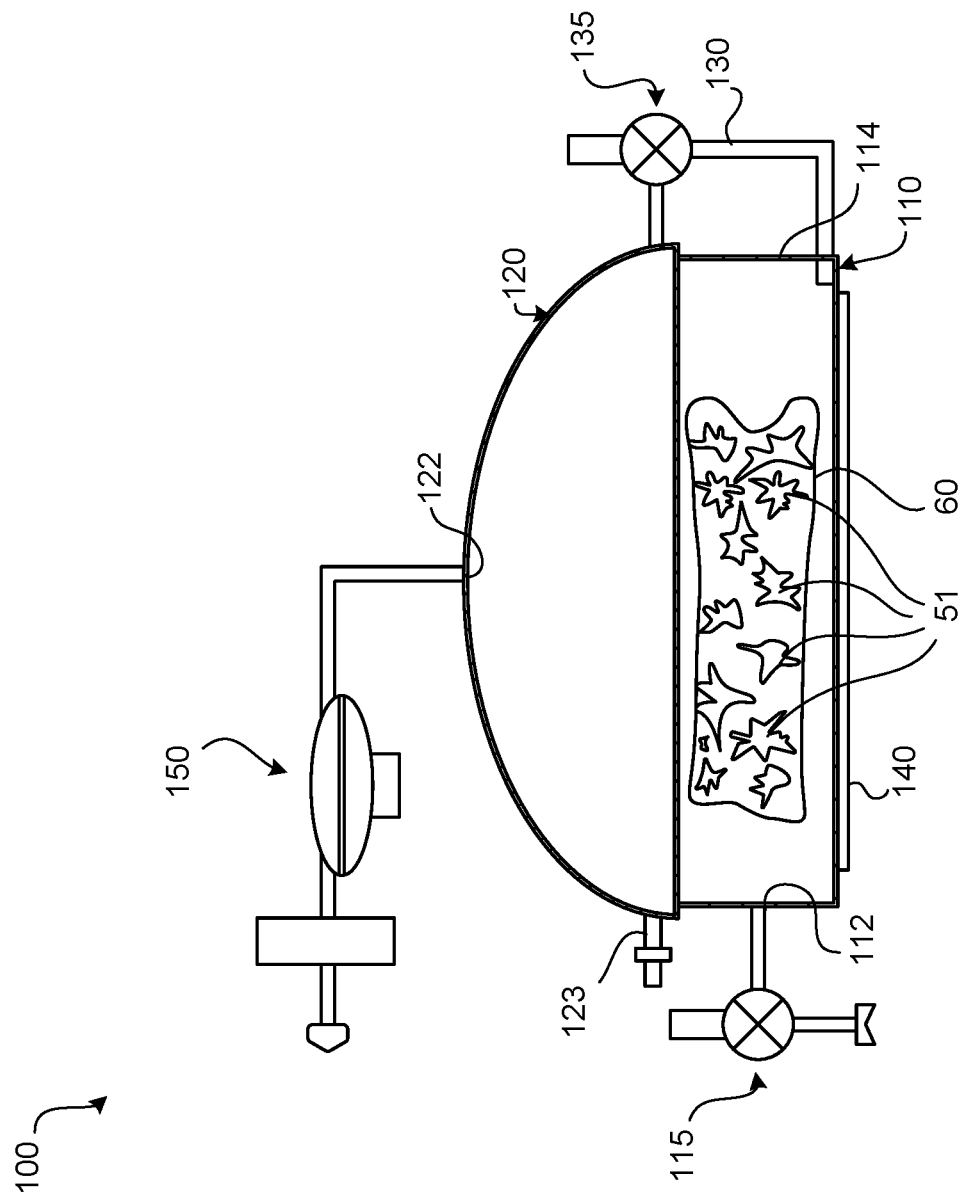

In various embodiments, and with reference to FIG. 2, a waste processing system 10 is disclosed. The waste processing system 10, according to various embodiments, includes the fluid extraction apparatus 100 described above, as well as a controller 20 and a tangible, non-transitory memory. The tangible, non-transitory memory may be configured to communicate with the processor and may have instructed stored thereon that, in response to execution by the processor, cause the waste processing system to perform the various operations mentioned above and described below. The waste processing system 10 may include various sensors 21, 22, 23, 24, such as temperature and pressure sensors, that provide feedback to the controller 20. The controller 20 may be in electronic communication with the various components of the apparatus 100, such as the air valve 115, the intermediate valve 135, and the vacuum source, among others.

The controller 20 may be integrated into computer systems onboard an aircraft or spacecraft. The controller 20 may also be a standalone computer system separate from the aircraft/spacecraft and in electronic communication with the aircraft/spacecraft. The processor of the controller 20 may include one or more processors and/or one or more tangible, non-transitory memories that are capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 20 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 6:
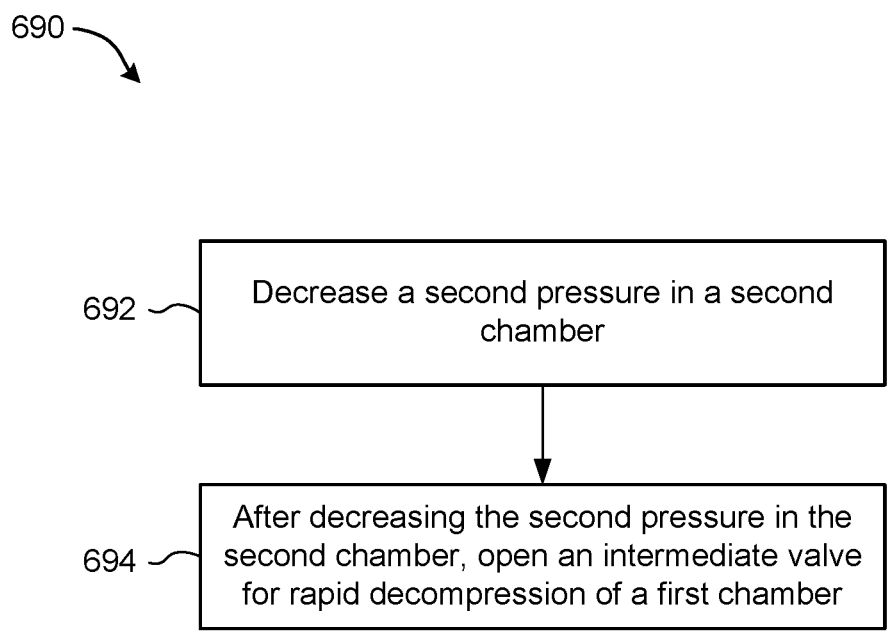
FIG. 6 is a schematic flowchart diagram of a method for extracting fluid from waste material, in accordance with various embodiments.

In various embodiments, and with reference to FIG. 6, a method 690 of extracting fluid from waste material 50 is disclosed. The method 690 may include decreasing a second pressure in the second chamber 120 at step 692 and then opening the intermediate valve 135 for rapid decompression of the first chamber 110 at step 694. That is, the first and second chambers 110, 120 may be fluidly isolated during the evacuation of the second chamber at step 692. Once the second chamber 120 has been sufficiently evacuated, fluid communication between the two chambers 110, 120 is opened, thus rapidly decompressing (e.g., evacuating) the first chamber 110. In various embodiments, and with momentary reference to FIG. 3, the rapid decompression of the first chamber 110 at step 694 causes the solid waste material 51 to "popcorn" or self-inflate due to the internal water content. This rapid decompression step (step 694) may include opening the intermediate valve 135 disposed between the first and second chambers 110, 120, and this valve 135 may only be open for a short period of time. The contents of the first chamber 110 may be warmed, via introduction of cabin air via air valve 115 and inlet 112 or via the heater 140 to prevent freezing of the waste material. In various embodiments, steps 692 and 694 may be repeated multiple times (e.g., multiple cycles or multiple decompression stages). The second chamber 120 itself may begin to operate as a type of vacuum pump because the second chamber 120 may fall to temperatures so low that fluid contained with the waste material 50 is pulled from the first chamber 110 to condense in the second chamber 120. In various embodiments, and with momentary reference to FIG. 4, the method 690 may also include compacting the waste material 52 after the fluid has been extracted therefrom. This compaction step may be performed after the one or more cycles of steps 692 and 694, and may be accomplished by rapidly re-pressurizing first chamber 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fluid extraction apparatus comprising:
   a first chamber within which waste material is configured to be disposed; and
   a second chamber comprising a vacuum source interface;
   wherein the first chamber is in selective fluid communication with the second chamber; and
   wherein the second chamber is rotatable to facilitate collection of extracted fluid.

2. The fluid extraction apparatus of claim 1, further comprising an intermediate valve disposed on a conduit extending between the first chamber and the second chamber, wherein the intermediate valve is selectively actuatable to control the selective fluid communication.

3. The fluid extraction apparatus of claim 2, wherein the selective fluid communication between the first chamber and the second chamber is exclusively via the intermediate valve and the conduit.

4. The fluid extraction apparatus of claim 1, wherein the first chamber comprises an air inlet.

5. The fluid extraction apparatus of claim 1, wherein the first chamber comprises a sealable door, wherein the sealable door is configured to open to allow the waste material to be placed within the first chamber.

6. The fluid extraction apparatus of claim 1, wherein the second chamber comprises a fluid outlet through which extracted fluid from the waste material is configured to flow.

7. The fluid extraction apparatus of claim 1, further comprising a heater coupled to the first chamber.

8. The fluid extraction apparatus of claim 1, wherein the second chamber comprises heat transfer augmentation features.

9. A waste processing system comprising:
   a fluid extraction apparatus comprising:
      a first chamber within which waste material is configured to be disposed;
      a second chamber comprising a vacuum source interface, wherein the first chamber is in selective fluid communication with the second chamber; and an intermediate valve disposed fluidly between the first chamber and the second chamber, wherein the intermediate valve is selectively actuatable to control the selective fluid communication;

a controller having a processor; and a tangible, non-transitory memory configured to communicate with the processor, the tangible, non-transitory memory having instructions stored thereon that, in response to execution by the processor, cause the waste processing system to perform operations comprising:

decreasing, by the processor and with the intermediate valve in a closed position, a second pressure in the second chamber; and after decreasing the second pressure in the second chamber, actuating the intermediate valve, by the processor, to an open position to cause rapid decompression of the first chamber, thereby lowering a first pressure in the first chamber wherein the second chamber is rotatable to facilitate collection of extracted fluid.

10. The waste processing system of claim 9, further comprising a vacuum source coupled to the second chamber at the vacuum source interface, wherein the decreasing the second pressure in the second chamber comprises at least one of actuating the vacuum source and actuating a vacuum valve disposed between the vacuum source and the second chamber.

11. The waste processing system of claim 9, wherein the first chamber comprises an air inlet and an air valve, wherein the operations further comprise actuating the air valve to introduce air into the first chamber to facilitate transport of extracted fluid from the waste material in the first chamber to the second chamber.

12. The waste processing system of claim 9, wherein the operations further comprise repeating the decreasing and the actuating.

13. A method for extracting fluid from waste material, the method comprising:

decreasing a second pressure in a second chamber with an intermediate valve in a closed position, wherein the intermediate valve is disposed between the second chamber and a first chamber; and after decreasing the second pressure in the second chamber, actuating the intermediate valve to an open position to cause rapid decompression of the first chamber, thereby lowering a first pressure in the first chamber and thereby extracting the fluid contained with the waste material disposed within the first chamber wherein the second chamber is rotatable to facilitate collection of extracted fluid.

14. The method of claim 13, wherein the actuating the intermediate valve to the open position causes the fluid to exit the first chamber and flow into the second chamber.

15. The method of claim 13, further comprising actuating a heater coupled to the first chamber to control a temperature of the waste material.

16. The method of claim 13, wherein the decreasing the second pressure in the second chamber comprises at least one of actuating a vacuum source and actuating a vacuum valve disposed between the vacuum source and the second chamber.

17. The method of claim 13, further comprising actuating an air valve coupled to the first chamber to introduce air into the first chamber to facilitate transport of the fluid from the first chamber to the second chamber.

18. The method of claim 14, further comprising repeating the decreasing and the actuating steps.

* * * * *